United States Patent
Chen

(10) Patent No.: US 11,785,113 B2
(45) Date of Patent: Oct. 10, 2023

(54) CLIENT SERVICE TRANSMISSION METHOD AND APPARATUS

(71) Applicant: Huawei Technologies Co., Ltd., Shenzhen (CN)

(72) Inventor: Yujie Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/661,559

(22) Filed: Oct. 23, 2019

(65) Prior Publication Data

US 2020/0059436 A1    Feb. 20, 2020

Related U.S. Application Data

(63) Continuation of application No. PCT/CN2017/081729, filed on Apr. 24, 2017.

(51) Int. Cl.
| | |
|---|---|
| *H04L 67/568* | (2022.01) |
| *H04L 47/2408* | (2022.01) |
| *H04L 47/56* | (2022.01) |
| *H04L 45/50* | (2022.01) |
| *H04L 67/60* | (2022.01) |
| *H04L 47/52* | (2022.01) |
| *H04L 67/62* | (2022.01) |

(52) U.S. Cl.
CPC ............ *H04L 67/568* (2022.05); *H04L 45/50* (2013.01); *H04L 45/502* (2013.01); *H04L 47/2408* (2013.01); *H04L 47/52* (2013.01); *H04L 47/56* (2013.01); *H04L 67/60* (2022.05); *H04L 67/62* (2022.05)

(58) Field of Classification Search
None
See application file for complete search history.

(56) References Cited

U.S. PATENT DOCUMENTS

| | | | | |
|---|---|---|---|---|
| 4,429,415 A | * | 1/1984 | Chin | H03J 7/28 455/192.3 |
| 5,282,203 A | * | 1/1994 | Oouchi | H04L 12/5602 370/235 |

(Continued)

FOREIGN PATENT DOCUMENTS

| | | |
|---|---|---|
| CN | 1787483 A | 6/2006 |
| CN | 101860481 A | 10/2010 |

(Continued)

OTHER PUBLICATIONS

European Patent Office, Translation of CN101860841 (Oct. 13, 2010) (Year: 2010).*

*Primary Examiner* — Lance Leonard Barry
(74) *Attorney, Agent, or Firm* — Slater Matsil, LLP

(57) ABSTRACT

This application discloses a client service transmission method and apparatus. The method may include: receiving a client service, where the client service includes a plurality of data blocks, the client service is corresponding to a counter, and the counter is used to control an output rate of the client service; and sending the plurality of data blocks in a plurality of sending periods, where when a count value of the counter reaches a preset threshold in each sending period, at least one data block of the plurality of data blocks is sent. This technology may be applied to a scenario in which a transmission node transmits a client service.

17 Claims, 11 Drawing Sheets

(56) References Cited

U.S. PATENT DOCUMENTS

| | | | |
|---|---|---|---|
| 6,771,662 B1* | 8/2004 | Miki | H04L 49/3009 |
| | | | 370/469 |
| 7,649,910 B1* | 1/2010 | Wechsler | H04L 12/422 |
| | | | 370/518 |
| 8,797,860 B2* | 8/2014 | Sun | H04L 47/12 |
| | | | 370/412 |
| 10,027,594 B1* | 7/2018 | Seshadri | H04L 45/745 |
| 10,687,128 B2* | 6/2020 | Szymanski | H04Q 11/0062 |
| 2002/0114292 A1* | 8/2002 | Kawabata | H04Q 11/0478 |
| | | | 370/329 |
| 2002/0133629 A1* | 9/2002 | Jones | A61K 49/0008 |
| | | | 709/249 |
| 2002/0159120 A1 | 10/2002 | Kitayama et al. | |
| 2005/0036455 A1* | 2/2005 | Bakker | H04L 12/189 |
| | | | 370/312 |
| 2006/0168316 A1* | 7/2006 | Kabashima | H04L 12/4666 |
| | | | 709/238 |
| 2006/0242319 A1* | 10/2006 | Sang | H04L 12/66 |
| | | | 709/240 |
| 2007/0133568 A1* | 6/2007 | Qing | H04L 12/66 |
| | | | 370/399 |
| 2012/0328288 A1* | 12/2012 | Vandegriend | H04J 3/1658 |
| | | | 398/43 |
| 2013/0084063 A1* | 4/2013 | Hu | H04L 49/10 |
| | | | 370/219 |
| 2014/0064081 A1 | 3/2014 | Morandin | |
| 2014/0199067 A1* | 7/2014 | Ahuja | H04Q 11/0066 |
| | | | 398/52 |
| 2015/0264454 A1* | 9/2015 | Xiao | H04Q 11/0003 |
| | | | 398/52 |
| 2016/0021016 A1 | 1/2016 | Haramaty et al. | |
| 2016/0044392 A1* | 2/2016 | Surek | H04Q 11/0003 |
| | | | 398/45 |
| 2016/0359758 A1 | 12/2016 | Shpiner et al. | |
| 2017/0187641 A1* | 6/2017 | Lundqvist | H04L 47/70 |

FOREIGN PATENT DOCUMENTS

| | | |
|---|---|---|
| CN | 103416031 A | 11/2013 |
| CN | 105814934 A | 7/2016 |
| CN | 105915468 A | 8/2016 |
| CN | 106506119 A | 3/2017 |
| JP | 2003289333 A | 10/2003 |
| JP | 2007181085 A | 7/2007 |
| JP | 2008306471 A | 12/2008 |

* cited by examiner

CLIENT SERVICE TRANSMISSION METHOD AND APPARATUS

CROSS-REFERENCE TO RELATED APPLICATIONS

This application is a continuation of International Application No. PCT/CN2017/081729, filed on Apr. 24, 2017. The disclosure of the aforementioned application is hereby incorporated by reference in its entirety.

TECHNICAL FIELD

This application relates to the field of data transmission technologies, and in particular, to a client service transmission method and apparatus.

BACKGROUND

In a packet service system, an existing transmission node transmits a client service based on a best effort delivery mechanism. For example, if a client device A sends a client service to a client device B by using a transmission node, and output line interface bandwidth of the transmission node is 100 Gbps (gigabit per second), a rate at which the transmission node outputs the client service (that is, an output rate of the client service) may be as close as possible to 100 Gbps. Based on this, if a size of the client service that is input into the transmission node in a second is 10 M (megabit), a transmission time of the client service in the transmission node may be theoretically 10 M/100 Gbps; if a size of the client service that is input into the transmission node in a second is 100 M, a transmission time of the client service in the transmission node may be theoretically 100 M/100 Gbps, and so on.

In this case, if a plurality of client devices simultaneously send client services to one transmission node, for the client service sent by each client device, the transmission node uses the best effort delivery mechanism to transmit the client service. Consequently, congestion inevitably occurs.

SUMMARY

Embodiments of this application provide a client service transmission method and apparatus, so as to reduce an occurrence probability of congestion on an output line interface and even avoid occurrence of congestion.

To achieve the foregoing objective, this application provides the following technical solutions.

According to a first aspect, this application provides a client service transmission method, including: receiving a client service, where the client service includes a plurality of data blocks, the client service is corresponding to a counter, and the counter is used to control an output rate of the client service; and sending the plurality of data blocks in a plurality of sending periods, where when a count value of the counter reaches a preset threshold in each sending period, at least one data block of the plurality of data blocks is sent. The method may be performed by a transmission node. In the technical solution, the counter is set in the transmission node, and a quantity of output data blocks is controlled based on the count value of the counter in each sending period. In this way, an output rate of a data block can be controlled, that is, the output rate of the client service is controlled. If an output rate of each client service that is input into the transmission node is controlled according to the technical solution, this helps reduce an occurrence probability of congestion on an output line interface and even avoid occurrence of congestion.

In a possible design, before the count value of the counter reaches the preset threshold in each sending period, the method may further include: increasing the count value of the counter by C in each counting period of the counter, where C is less than or equal to the preset threshold. A physical meaning of C is not limited in this application. For example, C may be a quantity of counting times of the counter. In this case, C is equal to 1. For another example, C may be determined according to bandwidth of the client service, and the preset threshold may be determined according to output line interface bandwidth. Certainly, this is not limited in specific implementation.

In a possible design, for ease of control, a concept of unit bandwidth is introduced in this application. Based on this, C may be a ratio of the bandwidth of the client service to unit bandwidth, the preset threshold may be a ratio of the output line interface bandwidth to an adjustment value of the unit bandwidth, and the adjustment value of the unit bandwidth is greater than or equal to the unit bandwidth.

In a possible design, the counter starts counting from an initial value in each sending period. Optionally, initial values of the counter may be the same in different sending periods, for example, the initial values are 0. Alternatively, initial values of the counter may be different in different sending periods. For example, in an (i+1)th sending period, an initial value of the counter is a value that is obtained by subtracting the preset threshold from a count value of the counter at an end of an ith sending period, and i is an integer greater than or equal to 1. Certainly, this is not limited in specific implementation.

In a possible design, that when a count value of the counter reaches a preset threshold in each sending period, at least one data block of the plurality of data blocks is sent may include: when the count value of the counter reaches the preset threshold in each sending period, the at least one data block of the plurality of data blocks is sent if the client service is cached.

In a possible design, the method may further include: when the count value of the counter reaches the preset threshold in each sending period, stopping counting of the counter if the client service is not cached. Based on this, the method may further include: when the client service is cached, sending the at least one data block of the plurality of data blocks, and starting counting, by the counter, from the initial value; or after the client service is received, directly sending the at least one data block without caching the at least one data block.

In a possible design, after the client service is received, the method may further include: storing the client service into a cache queue; and when the count value of the counter reaches the preset threshold, obtaining the at least one data block from the cache queue. Each client service may be corresponding to one cache queue. In this application, the client service is cached, and then the at least one data block is obtained from the cache queue and is sent. This can reduce a packet loss rate in a process of controlling the output rate of the data block.

In a possible design, each data block of the plurality of data blocks has a fixed length. Therefore, this has a beneficial effect of simple implementation. Certainly, in specific implementation, lengths of different data blocks may be different.

In a possible design, that at least one data block of the plurality of data blocks is sent may include: sending the at least one data block of the plurality of data blocks according to a priority of the client service, where a lower expected transmission delay indicates a higher priority. In the implementation, when different client services are output, expected transmission delays are considered, so as to better meet transmission delay requirements of different client services, thereby improving user experience.

According to a second aspect, this application provides a client service transmission apparatus, where the apparatus has a function of implementing each step in the foregoing method embodiment. The function may be implemented by using hardware, or may be implemented by hardware by executing corresponding software. The hardware or software includes one or more modules corresponding to the foregoing function.

In a possible design, the apparatus may include: a processor, a memory, a bus, and a communications interface, where the memory is configured to store a computer executable instruction; the processor, the memory, and the communications interface are connected by using the bus; and when the apparatus runs, the processor executes the computer executable instruction stored in the memory, so that the apparatus performs any client service transmission method according to the first aspect.

According to a third aspect, this application provides a computer readable storage medium, configured to store a computer program instruction used by the foregoing apparatus; and when the computer program instruction runs on a computer, the computer can perform any client service transmission method according to the first aspect.

According to a fourth aspect, this application provides a computer program product, where the computer program product includes an instruction; and when the instruction runs on a computer, the computer can perform any client service transmission method according to the first aspect.

For a technical effect of any one of the apparatus, the computer readable medium, or the computer program product provided above, refer to a technical effect brought by a corresponding method. Details are not described herein again.

DETAILED DESCRIPTION OF ILLUSTRATIVE EMBODIMENTS

Figure 1:
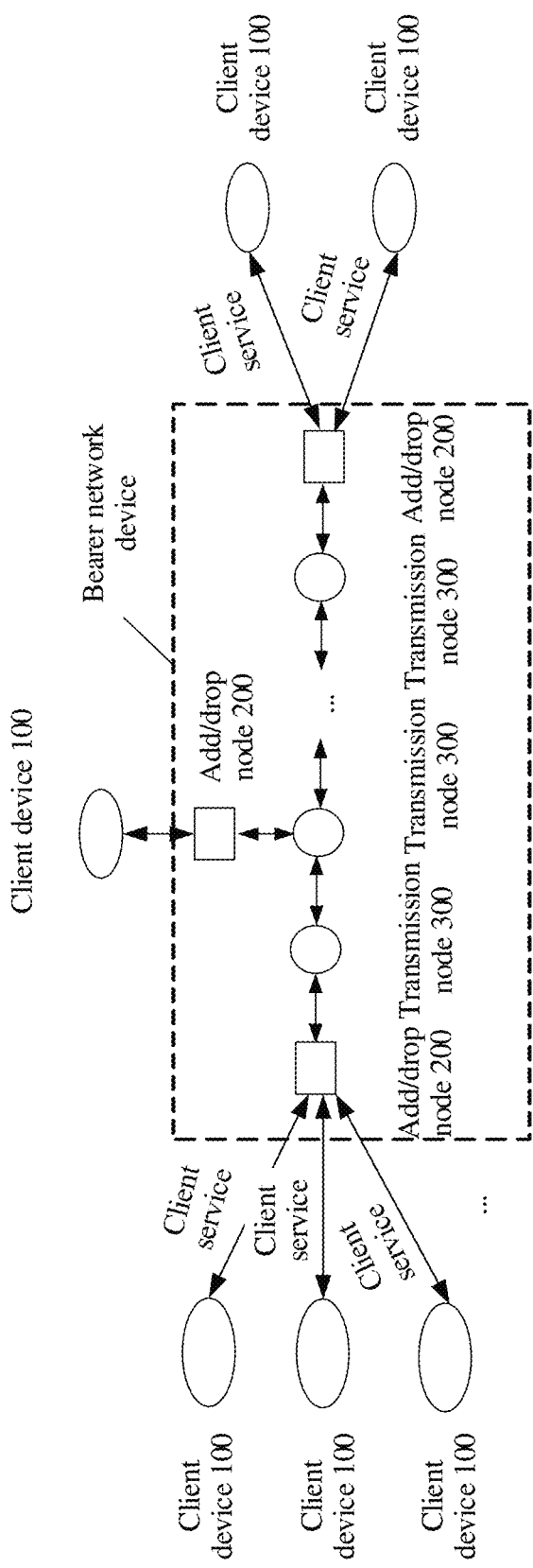
FIG. 1 is a schematic diagram of a system architecture applicable to a technical solution according to an embodiment of this application.

FIG. 1 shows a schematic diagram of a system architecture applicable to a technical solution according to an embodiment of this application. The system architecture may include a bearer network device and a plurality of client devices 100. In this system, one or more client devices send a client service to one or more other client devices by using the bearer network device. For ease of understanding, a client device that sends a client service is referred to as a transmit end client device in the following, and a client device that receives the client service is referred to as a receive end client device. It may be understood that one client device may be used as both a transmit end client device and a receive end client device. The bearer network device may include add/drop nodes 200 connected to the transmit end client devices or the receive end client devices, and one or more transmission nodes 300 disposed between the add/drop nodes 200. Any one or more transmission nodes 300 may be integrated with any one or more add/drop nodes 200, or may be independently disposed. In this application, an example in which the add/drop node 200 and the transmission node 300 are independently disposed is used for description.

The client service may include but is not limited to an Ethernet client service, a synchronous digital hierarchy (SDH) client service, a storage service, and a video service. One transmit end client device may transmit one or more client services to one or more receive end client devices. A plurality of transmit end client devices may transmit one or more client services to a same receive end client device.

The system shown in FIG. 1 may be an optical network, and may be specifically an access network, for example, a passive optical network (PON); or may be a transport network, for example, an optical transport network (OTN), a packet network, or a packet switched network.

The client device 100 (which includes the transmit end client device and/or the receive end client device) may include but is not limited to any one of the following: a switch, a router, a computer, a data center, or a base station. The add/drop node 200 and the transmission node 300 each may include but are not limited to any one of the following: an OTN device or a router.

The add/drop node 200 may be configured to: receive a client service sent by the transmit end client device in a form of a data packet or in a form of a continuous data stream, divide the client service in the form of the data packet or in the form of the continuous data stream into a plurality of data blocks (slice), and exchange the plurality of data blocks to corresponding transmission nodes 300 according to routing information; or receive a data block sent by the transmission node 300, restore a plurality of data blocks that belong to a same client service to a form of a data packet or a form of a continuous data stream, and send the data packet or the continuous data stream to a corresponding receive end client device. Each add/drop node 200 may include one or more input/output ends. Each input/output end may be connected to the one or more client devices 100 (which include the transmit end client device or the receive end client device), or connected to the one or more transmission nodes 300.

The transmission node 300 may be configured to forward a data block to another transmission node 300 or the add/drop node 200 according to the routing information. Each transmission node 300 may include one or more input/output ends. Each input/output end may be connected to the one or more transmission nodes 300, or connected to the one or more add/drop nodes 200. It should be noted that an output line interface in the following may be considered as an output end of the transmission node 300.

It may be understood that, an input end of either of the add/drop node 200 or the transmission node 300 in some scenarios may serve as an output end of the device in some other scenarios. Specifically, serving as an input end or an output end is related to a path in a process of transmitting a client service this time, and the path may be determined according to the routing information. The routing information of the client service transmitted this time may be configured by a control layer and is sent to routing nodes (which include the add/drop node 200 and the transmission node 300) on the path. For a specific implementation process, refer to the prior art. The control layer may be a function module integrated in either of the add/drop node 200 or the transmission node 300, or may be a device independent of the add/drop node 200 and the transmission node 300. This is not limited in this application. Each output end is corresponding to one line interface bandwidth, and the line interface bandwidth is used to indicate a bearer capability of the output end.

It may be understood that FIG. 1 is merely an example of the system architecture applicable to this application. A quantity of client devices 100, add/drop nodes 200, and transmission nodes 300 that are included in the system architecture and a connection relationship between them are not limited in this application. In specific implementation, network layout may be performed according to an actual application scenario.

Figure 2:
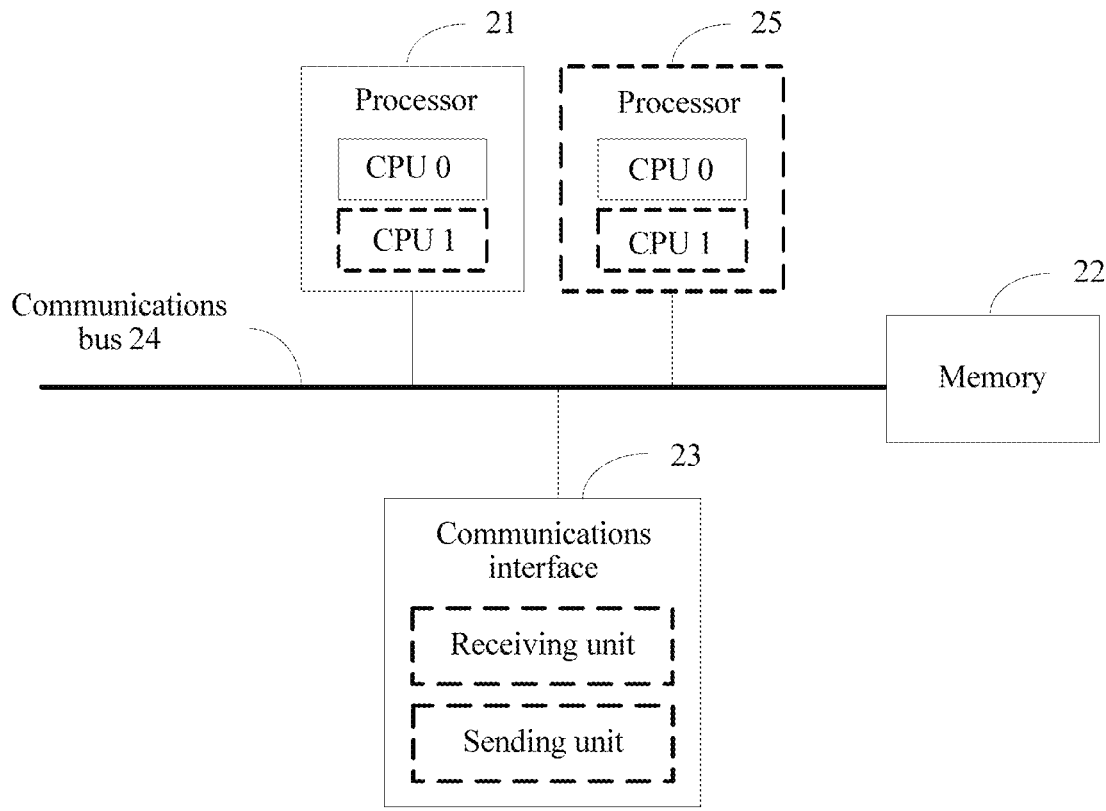
FIG. 2 is a schematic structural diagram of a client service transmission apparatus according to an embodiment of this application.

In an example of this application, a schematic structural diagram of any one or more add/drop nodes 200 and transmission nodes 300 in FIG. 1 is shown in FIG. 2. A device shown in FIG. 2 may include: at least one processor 21, a memory 22, a communications interface 23, and a communications bus 24.

The processor 21 is a control center of the device, and specifically, may be one processing element, or may be a generic term of a plurality of processing elements. For example, the processor 21 may be a central processing unit (CPU), or may be an application-specific integrated circuit (ASIC), or one or more integrated circuits configured to implement the technical solutions provided in the embodiments of this application. For example, the processor 21 may be one or more microprocessors (DSP) or one or more field programmable gate arrays (FPGA). The processor 21 may perform various functions of the device by running or executing a software program stored in the memory 22, and invoking data stored in the memory 22.

In specific implementation, in an embodiment, the processor 21 may include one or more CPUs, for example, a CPU 0 and a CPU 1 shown in FIG. 2.

In specific implementation, in an embodiment, the device may include a plurality of processors, for example, a processor 21 and a processor 25 shown in FIG. 2. Each of these processors may be a single-core (single-CPU) processor or a multi-core (multi-CPU) processor. The processor herein may be one or more devices, circuits, and/or processing cores configured to process data (for example, a computer program instruction).

The memory 22 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other compact disc storage, optical disc storage (which includes a compact disc, a laser disc, an optical disc, a digital versatile disc, a Blu-ray disc, and the like), a magnetic disk storage medium or another magnetic storage device, or any other medium that can be used to carry or store expected program code having an instruction or a data structure form and that can be accessed by a computer. However, this is not limited herein. The memory 22 may independently exist and is connected to the processor 21 by using the communications bus 24. Alternatively, the memory 22 may be integrated with the processor 21. The memory 22 is configured to store and execute the software program that is executed by the device in the technical solutions provided in the embodiments of this application, and the execution is controlled by the processor 21.

The communications interface 23 may be a type of apparatus using any transceiver (for example, an optical receiver or an optical module), and is configured to communicate with another device or a communications network, for example, an Ethernet, a radio access network (RAN), or a wireless local area network (WLAN). The communications interface 23 may include a receiving unit implementing a receiving function, and a sending unit implementing a sending function.

The communications bus 24 may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like. For ease of representation, the bus is represented by only one thick line in FIG. 2, but it does not indicate that there is only one bus or one type of bus.

Figure 3:
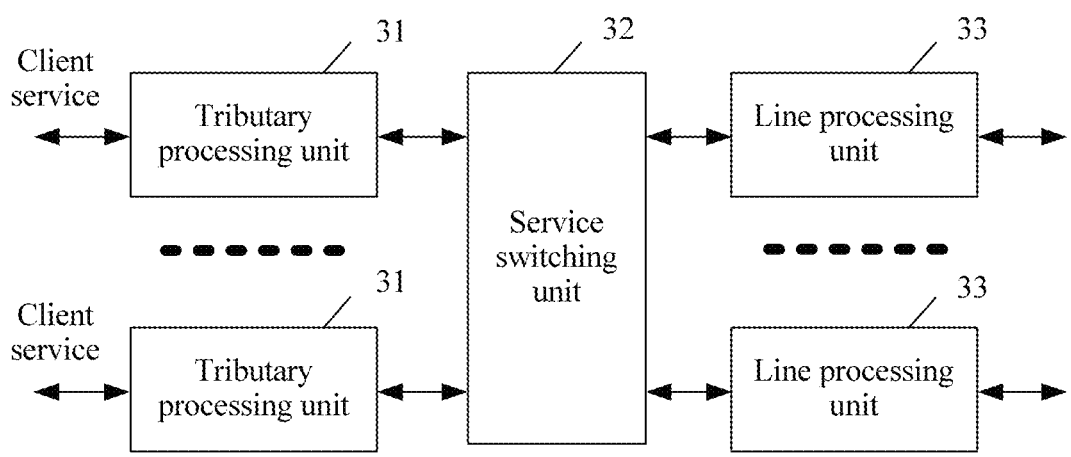
FIG. 3 is a schematic structural diagram of an add/drop node according to an embodiment of this application.

In an example of this application, a schematic structural diagram of the add/drop node 200 in FIG. 1 may be shown in FIG. 3. The add/drop node 200 shown in FIG. 3 may include one or more tributary processing units 31, a service switching unit 32, and one or more line processing units 33. The tributary processing unit 31 may be configured to: receive, by using the input end of the add/drop node 200, the client service sent by the transmit end client device, and divide the received client service into the data blocks, for example, divide the client service into fixed-length data blocks. Then, the service switching unit 32 exchanges the data blocks to a corresponding line processing unit 33. That the service switching unit 32 exchanges, to a specific line processing unit 33, the client service transmitted from the tributary processing unit 31 is not limited in this application. For a specific implementation process, refer to the prior art. The line processing unit 33 may be configured to output the received data blocks from the add/drop node 200 by using the output end of the add/drop node 200.

Figure 3A:
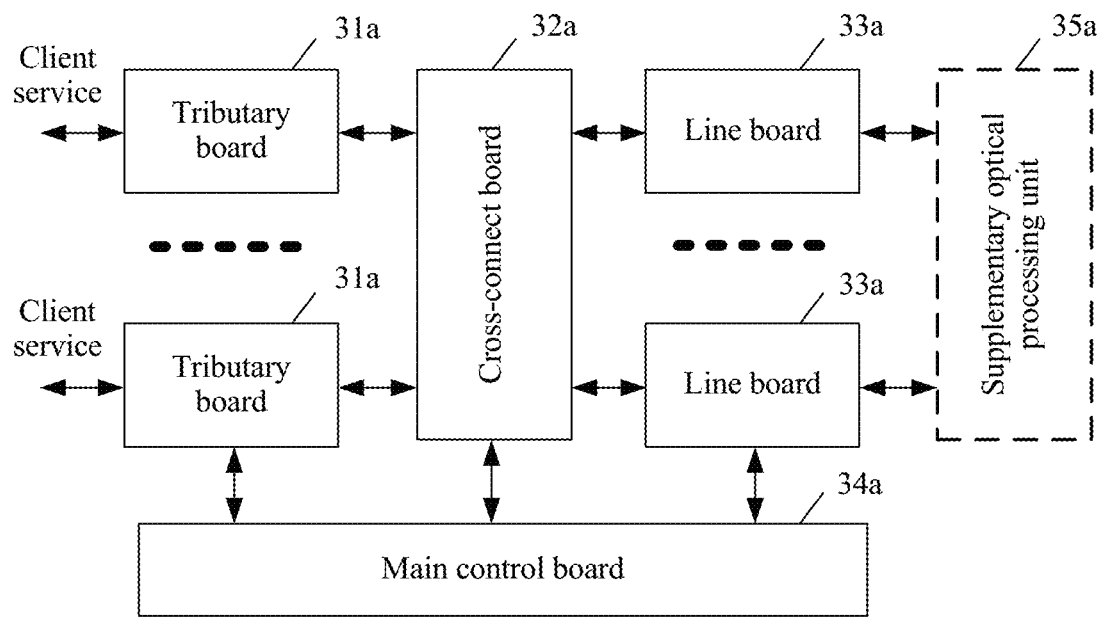
FIG. 3a is a schematic structural diagram of another add/drop node according to an embodiment of this application.

In hardware implementation, as shown in FIG. 3a, the tributary processing unit 31 may be a tributary board 31a, the service switching unit 32 may be a cross-connect board 32a, and the line processing unit 33 may be a line board 33a. The tributary board 31a, the cross-connect board 32a, and the line board 33a may be connected to a main control board 34a. The main control board 34a is a control center of the add/drop node 200, and is configured to control the tributary board 31a, the cross-connect board 32a, and the line board 33a to perform corresponding steps in methods provided in this application. For ease of brevity, FIG. 3a shows that one tributary board 31a and one line board 33a are connected to the main control board 34a. In actual implementation, each tributary board 31a and each line board 33a may be connected to the main control board 34a. Optionally, the add/drop node 200 may further include a supplementary optical processing unit 35a, and the supplementary optical processing unit 35a may include an optical amplification (OA) unit, an optical multiplexing (OM) unit, an optical demultiplexing (OD) unit, a single-channel optical supervisory channel (OSC) unit, a fiber interface unit (FIU), and the like.

Figure 4:
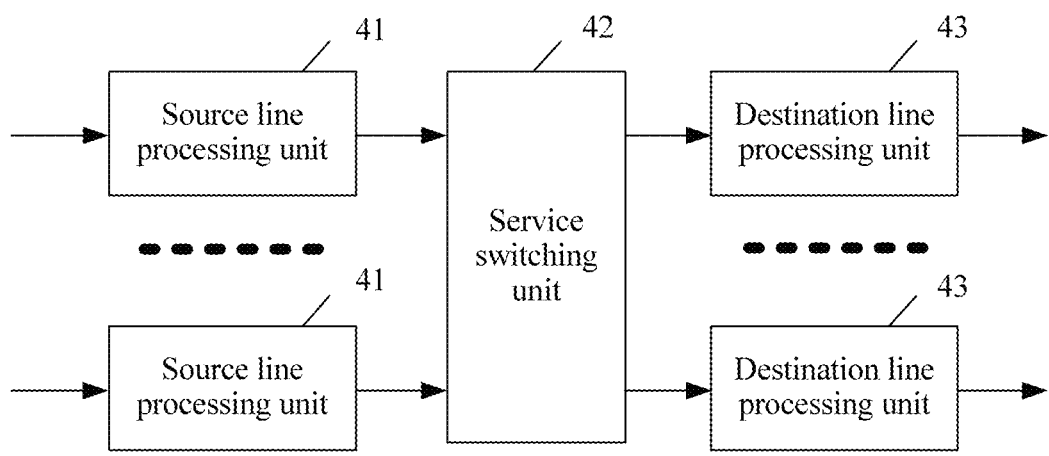
FIG. 4 is a schematic structural diagram of a transmission node according to an embodiment of this application.

In an example of this application, a schematic structural diagram of the transmission node 300 in FIG. 1 may be shown in FIG. 4. The transmission node 300 shown in FIG. 4 may include one or more source line processing units 41, a service switching unit 42, and one or more destination line processing units 43. The source line processing unit 41 may be configured to receive, by using the input end of the transmission node 300, a data block sent by the add/drop node 200 or another transmission node 300, and then the service switching unit 42 exchanges the data block to a corresponding destination line processing unit 43. That the service switching unit 42 exchanges, to a specific destination line processing unit 43, the client service transmitted from the source line processing unit 41 is not limited in this application. For a specific implementation process, refer to the prior art. The destination line processing unit 43 may be configured to output the received client service from the transmission node 300 by using the output end of the transmission node 300.

Figure 4A:
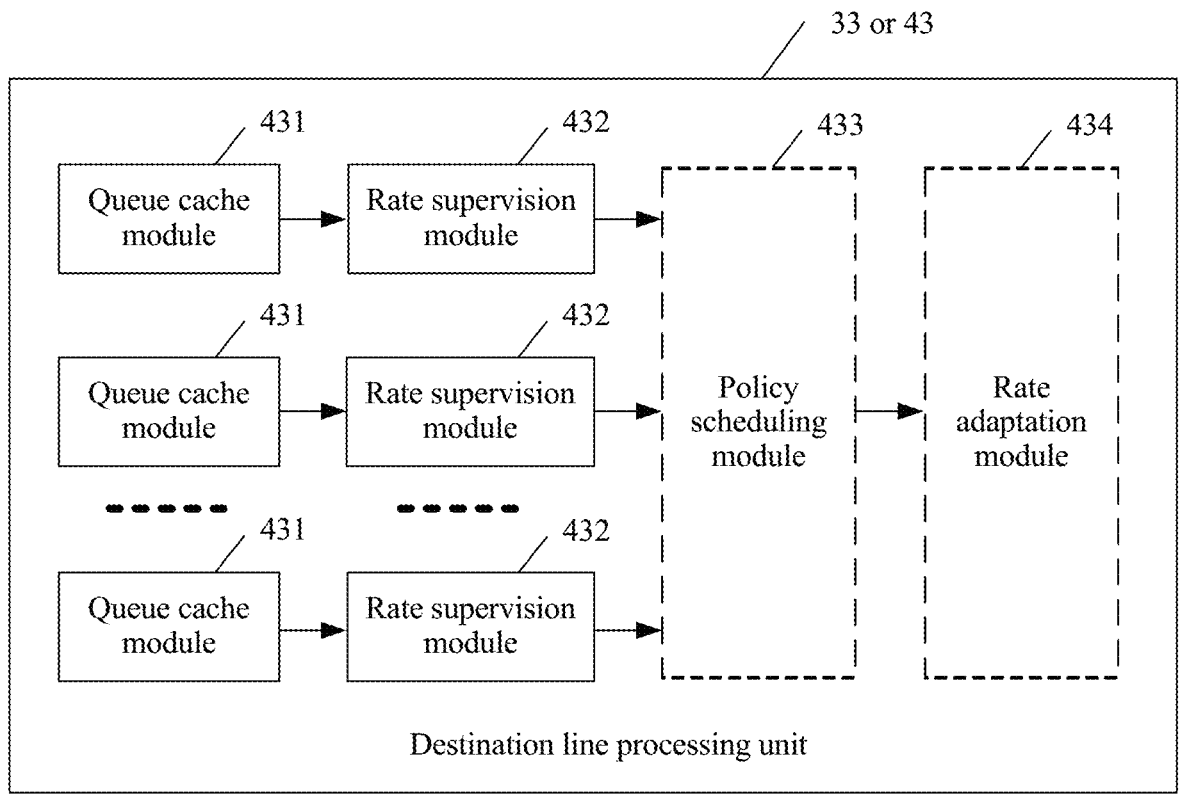
FIG. 4a is a schematic structural diagram of a line processing unit according to an embodiment of this application.

As shown in FIG. 4a, the line processing unit (which includes the line processing unit 33 and/or the destination line processing unit 43) may include a queue cache module 431 and a rate supervision module 432, and optionally, may further include a policy scheduling module 433. Optionally, the line processing unit may further include a rate adaptation module 434. An example of a connection relationship between the modules is shown in FIG. 4. For a function of each module, refer to the following description.

Figure 4B:
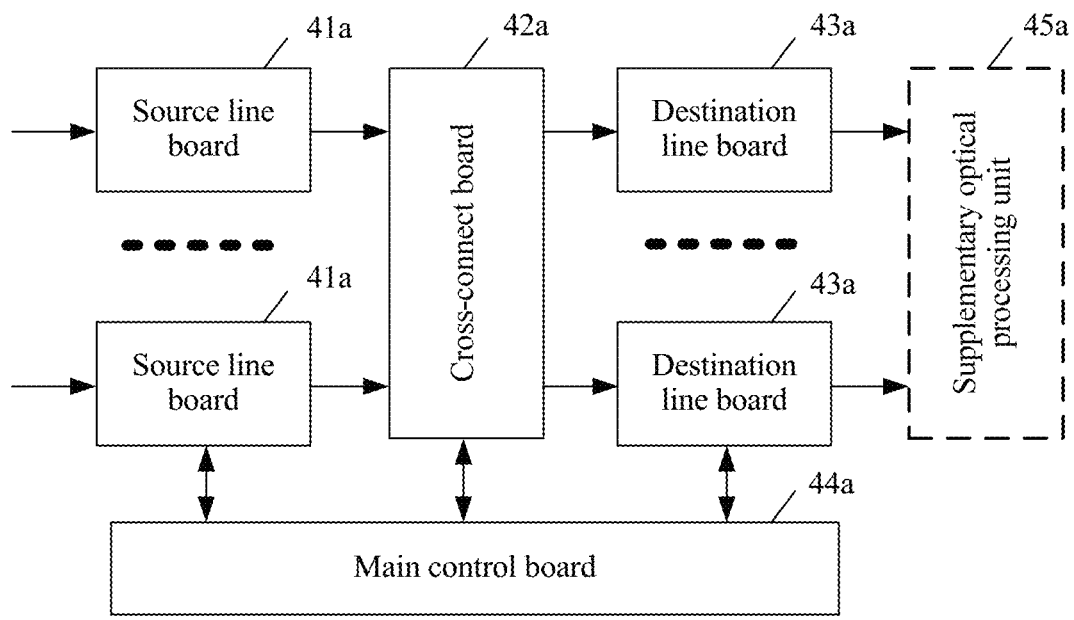
FIG. 4b is a schematic structural diagram of another transmission node according to an embodiment of this application.

In hardware implementation, the source line processing unit 41 may be a source line board 41a, the service switching unit 42 may be a cross-connect board 42a, and the destination line processing unit 43 may be a destination line board 43a. As shown in FIG. 4b, the source line board 41a, the cross-connect board 42a, and the destination line board 43a may be connected to a main control board 44a. The main control board 44a is a control center of the transmission node 300, and is configured to control the source line board 41a, the cross-connect board 42a, and the destination line board 43a to perform corresponding steps in methods provided in this application. For ease of brevity, FIG. 4b shows that one source line board 41a and one destination line board 43a are connected to the main control board 44a. In actual implementation, each source line board 41a and each destination line board 43a may be connected to the main control board 44a. Optionally, the transmission node 300 may further include a supplementary optical processing unit 45a. For a specific implementation of the supplementary optical processing unit 45a, refer to the supplementary optical processing unit 35a.

It should be noted that, the term "a/the plurality of" in this specification refers to at least two.

The terms "first", "second", and the like in this specification are merely intended to distinguish between different objects, and do not limit an order of the objects. For example, a first add/drop node and a second add/drop node are merely intended to distinguish between different add/drop nodes, and do not limit a sequence of the first add/drop node and the second add/drop node.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. It may be understood that, in a formula, "/" generally means that the associated objects have a "divisible" relationship.

The following describes in detail the technical solutions in the embodiments of this application.

Figure 5:
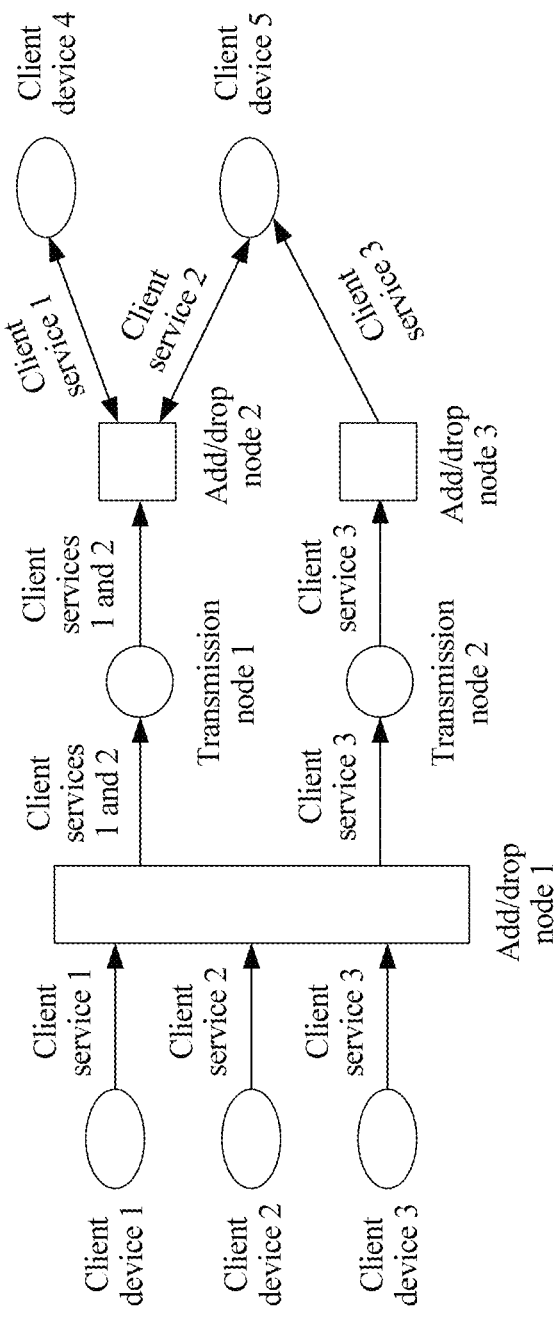
FIG. 5 is a schematic diagram of another system architecture applicable to a technical solution according to an embodiment of this application.

It should be noted that a specific example in the following is described by using an example in which the technical solution provided in this application is applied to a system architecture shown in FIG. 5. The system architecture shown in FIG. 5 is a specific implementation of a system architecture shown in FIG. 1. In FIG. 5, a client device 1 transmits a client service 1 to a client device 4 by using an add/drop node 1, a transmission node 1, and an add/drop node 2; a client device 2 transmits a client service 2 to a client device 5 by using the add/drop node 1, the transmission node 1, and the add/drop node 2; and a client device 3 transmits a client service 3 to the client device 5 by using the add/drop node 1, a transmission node 2, and an add/drop node 3. Actually, the technical solution provided in this application may also be applied to a scenario in which one transmit end client device sends a plurality of client services to an add/drop node. For a basic principle of the scenario, refer to the following description.

In addition, it should be noted that, an example in which operations of caching, rate supervision, policy scheduling, rate adaptation, and the like on a data block of a client service are applied to a transmission node is used for description in the following. In actual implementation, one or more of these operations may also be applied to the add/drop node (which includes a first add/drop node and/or a second add/drop node). For a specific implementation process of this scenario, refer to the description about applying these operations to the transmission node. Details are not described herein again in this application.

Figure 6:
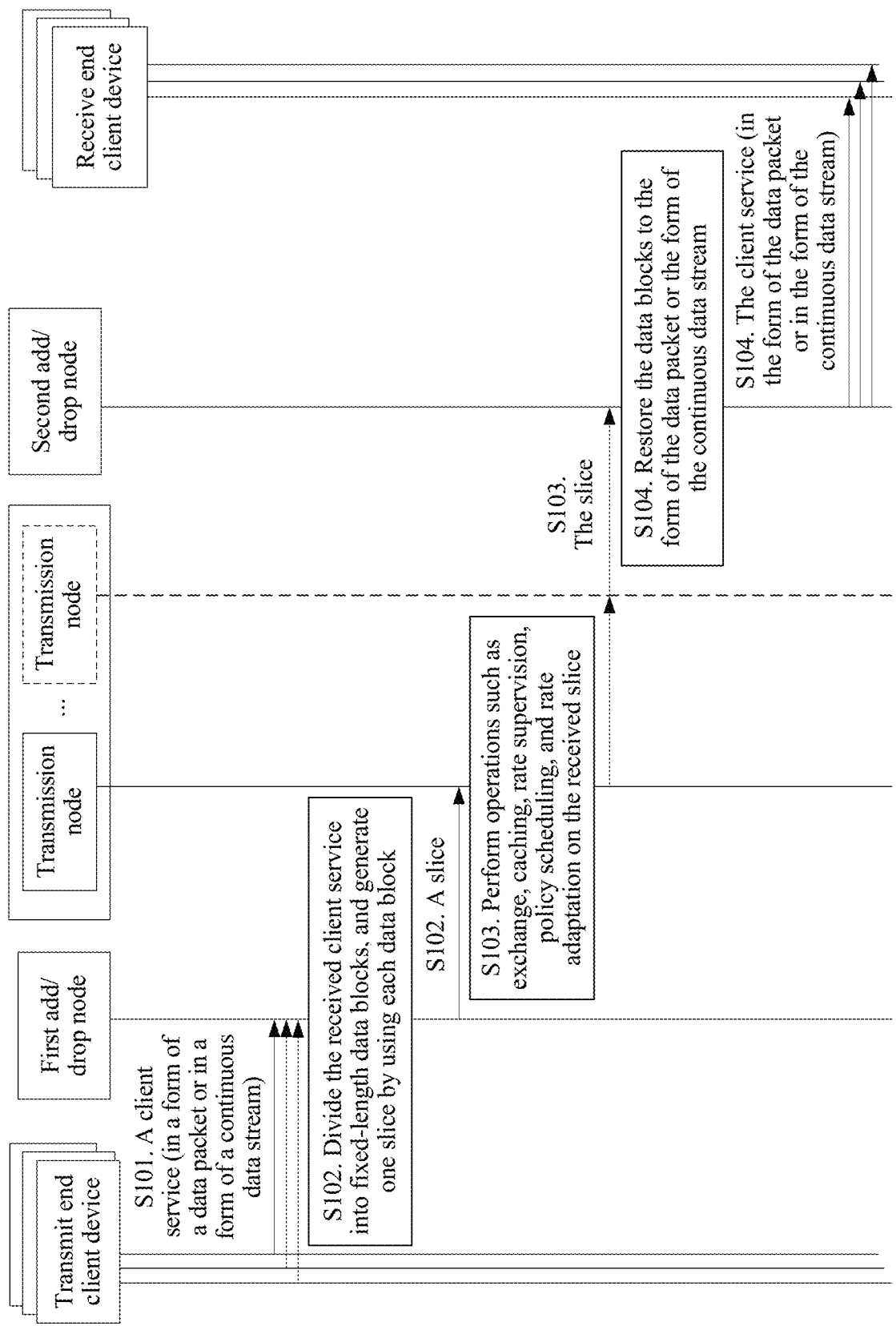
FIG. 6 is a schematic interaction diagram of a client service transmission method according to an embodiment of this application.

FIG. 6 shows a schematic interaction diagram of a client service transmission method according to an embodiment of this application. The method shown in FIG. 6 may include the following steps S101 to S104.

S101. A plurality of transmit end client devices send a client service to a first add/drop node, where the client service is transmitted in a form of a data packet or a form of a continuous data stream. The first add/drop node may be an add/drop node 1 in FIG. 5, which is used as an example for description in the following.

The plurality of transmit end client devices may be any plurality of transmit end client devices connected to the add/drop node 1. Any one or more transmit end client devices of the plurality of transmit end client devices may continuously or discontinuously send a client service to the add/drop node 1.

Based on a system architecture shown in FIG. 5, S101 may include: A client device 1 sends a client service 1 to the add/drop node 1, a client device 2 sends a client service 2 to the add/drop node 1, and a client device 3 sends a client service 3 to the add/drop node 1.

Before S101, the method may further include: applying, by each transmit end client device, to a control layer for bandwidth of the client service (for example, the client services 1, 2, or 3), so that the control layer controls the add/drop node 1 to reserve particular bandwidth for the transmit end client device to transmit the client service. The bandwidth of the client service may be determined by the transmit end client device according to a requirement (for example, a size of a to-be-transmitted client service and an expected transmission delay requirement). When a same transmit end client device sends different client services, bandwidth of the client services may be the same or may be different. When different transmit end client devices send a same client service, bandwidth of the client service may be the same or may be different. This is not limited in this application.

In an example of this application, for ease of control, unit bandwidth (that is, a minimum bandwidth granularity) is set in a system. Each transmit end client device may set the bandwidth of the client service to be an integral multiple of the unit bandwidth. For example, if the unit bandwidth is 2 Mbps, the bandwidth of the client service may be n×2 Mbps, where n may be an integer greater than or equal to 1.

S102. The first add/drop node receives the client service sent by the plurality of transmit end client devices, divides the received client service into fixed-length data blocks, generates one slice using each data block, and outputs each slice to a corresponding transmission node according to routing information.

Step S102 may be understood as follows: The add/drop node 1 maps the received client service into a bearer container, where each bearer container is used to carry one data block. It may be understood that "the bearer container" is a logical concept that is proposed to more vividly describe a data block division process, and may not actually exist.

Based on the system architecture shown in FIG. 5, S102 may include: The add/drop node 1 receives the client service 1 sent by the client device 1, the client service 2 sent by the client device 2, and the client service 3 sent by the client device 3, equally divides the client services 1, 2, and 3 into the fixed-length data blocks, and generates one slice by using each data block. Then, the add/drop node 1 outputs each slice of the client service 1 to the transmission node 1, outputs each slice of the client service 2 to the transmission node 1, and outputs each slice of the client service 3 to the transmission node 2.

When receiving one or more data packets or continuous data streams, the add/drop node 1 may divide the received data packets or continuous data streams into data blocks according to a sequence of receiving times. Each data block may have a fixed length, that is, the add/drop node 1 equally divides any received client service sent by any transmit end client device into fixed-length data blocks. For ease of description, an example in which the data block has a fixed length is used for description in this application. In actual implementation, lengths of different data blocks may not be equal. It may be understood that, "the data block" herein includes the client service, and optionally, may further include some associated information of the client service, and the like.

For example, it is assumed that a length of a fixed-length data block is 123 bytes. When the bandwidth of the client service is 2 Mbps, an average rate of the data blocks that are input into the add/drop node 1 is 2 Mbps/123 bytes data blocks/second, that is, when a tributary processing unit of the add/drop node 1 forms the container, 2 Mbps/123 bytes data blocks are generated per second on average. When the bandwidth of the client service is 4 Mbps, an average rate of the data blocks that are input into the add/drop node 1 is 4 Mbps/123 bytes data blocks/second.

Figure 7:
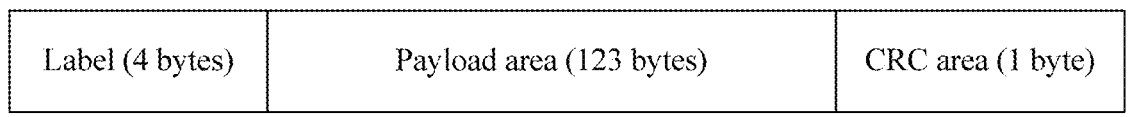
FIG. 7 is a schematic structural diagram of a data block according to an embodiment of this application.

To enable a bearer network device (which includes the first add/drop node, a second add/drop node, and/or the transmission node) to recognize the data block during processing (for example, exchange and transmission) of the data block, in an embodiment of this application, after dividing the received data packet or continuous data stream into fixed-length data blocks, the add/drop node 1 may add one label to each data block. Because transmission formats of different types of client services that are sent by the transmit end client device to the add/drop node 1 may be different, for ease of implementation, this application provides a format of a data block, as shown in FIG. 7. A format of any type of client service transmitted to the add/drop node 1 may be converted into the format shown in FIG. 7. In FIG. 7, the format of the data block may include a label and a payload area. Optionally, the format of the data block may further include a cyclic redundancy check (CRC) area.

The label may be a global label, or may be a line interface local label. The global label may be a label recognizable by each device in a system. The line interface local label may be a label recognizable by two devices that directly communicate with each other. Compared with the global label, the line interface local label occupies a smaller quantity of bits. An example in which the label is the line interface local label is used for description in the following. It may be understood that the label of the data block may be further used to distinguish between different client services. The label of the data block may be configured by the control layer. The payload area is used to carry the client service, and optionally, may be further used to carry some associated information of the client service, and the like. The CRC area is used to carry a check bit, where the check bit may be used to check integrity of the information carried in the payload area. Certainly, in specific implementation, integrity check may alternatively be implemented in another manner, and this is not limited to the CRC.

A size of bits occupied by any one of the label, the payload area, or the CRC area is not limited in this application. In FIG. 7, an example in which the label occupies 4 bytes, the payload area occupies 123 bytes, and the CRC area occupies 1 byte is used for description. It should be noted that, to distinguish "the data block" shown in FIG. 7 from "the data block" into which the add/drop node 1 divides the received client service, in this application, a data block including a label (as shown in FIG. 7) is referred to as a "slice". Each data block is corresponding to one slice, and each data block may be considered as information carried in a payload area of a slice corresponding to the data block.

Figure 8:
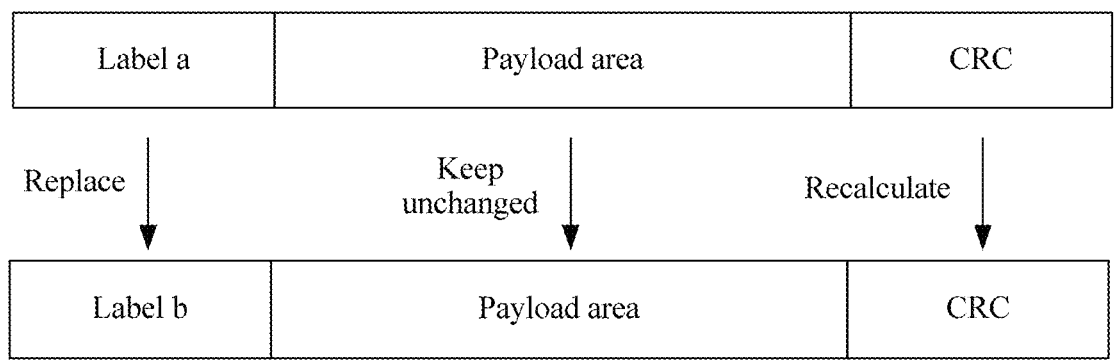
FIG. 8 is a schematic diagram of a label replacement process according to an embodiment of this application.

Optionally, if there is a one-to-many relationship between the input end and the output end of the add/drop node 1, for example, one client service is transmitted to different receive end client devices by using different paths, a procedure of processing a data block by the add/drop node 1 may include: The add/drop node 1 adds a label a to the data block, replaces the label a with a label b according to the routing information, and recalculates a CRC. Label replacement may be performed by any one of the tributary processing unit, a service switching unit, or a line processing unit in the add/drop node 1. A specific implementation process may be shown in FIG. 8.

Figure 9:
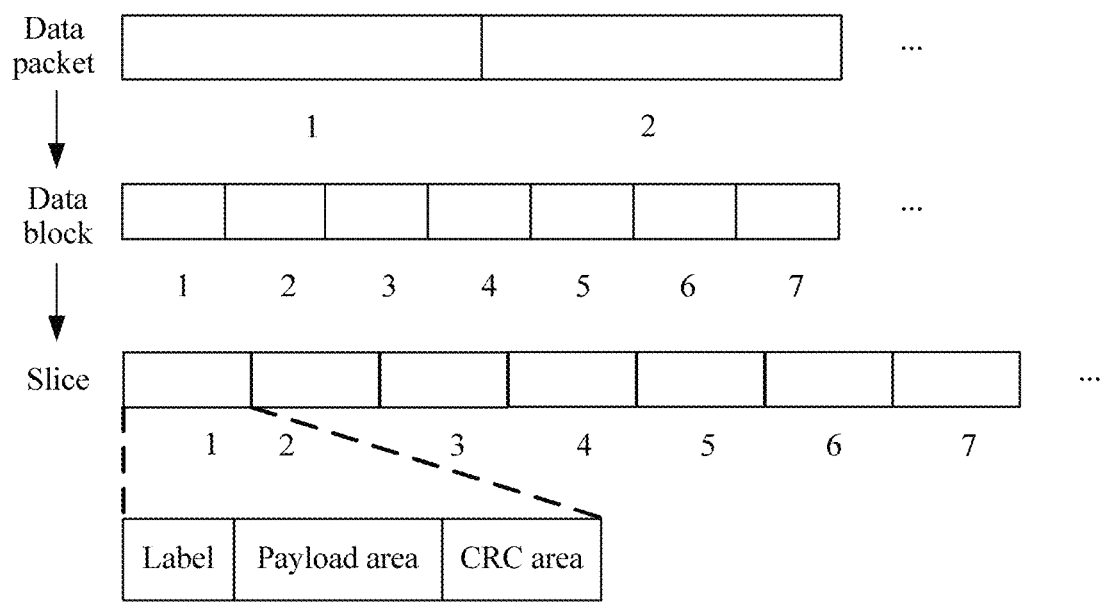
FIG. 9 is a schematic diagram of a processing process of an add/drop node according to an embodiment of this application.

FIG. 9 shows a schematic diagram of an implementation process of S102. In FIG. 9, an example in which the tributary processing unit 31 of the add/drop node 1 divides a received data packet or continuous data stream into data blocks and generates one slice by using each data block is used for description.

S103. The transmission node receives the slice, sent by the first add/drop node, of the client service and performs an exchange operation on the received slice according to the routing information; caches the exchanged slice according to the client service to which the exchanged slice belongs, where each client service is corresponding to one cache queue; and performs a rate supervision operation separately on the slice of each client service, performs a policy scheduling operation, a rate adaptation operation, and the like on the rate-supervised client service, and transmits, to a next routing node, the slice on which the foregoing operations are performed. The next routing node may be a next transmission node or the second add/drop node. If the next routing node is the second add/drop node, S104 is performed. If the next routing node is the transmission node, the transmission node continues to perform S103, . . . , until the next routing node is the second add/drop node, and then S104 is performed.

It may be understood that, cache space is usually shared by all cache queues. Each time the transmission node receives a client service within a bearer capability range of the transmission node, the transmission node may allocate a cache queue for the client service.

Based on the system architecture shown in FIG. 5, the second add/drop node may include an add/drop node 2 and an add/drop node 3. S103 may include: The transmission node 1 receives slices of the client services 1 and 2 sent by the add/drop node 1, and transmits the slices of the client services 1 and 2 to the add/drop node 2; and the transmission node 2 receives a slice of the client service 3 sent by the add/drop node 1, and transmits the slice of the client service 3 to the add/drop node 3.

It may be understood that, that the transmission node performs an exchange operation on the received slice according to the routing information may include: the transmission node determines, according to the routing information, the next routing node of the slice, and then performs the exchange operation. Optionally, if the label of the data block is the line interface local label, the transmission node further needs to perform a label replacement action in a process of performing the exchange operation. For example, based on the system architecture shown in FIG. 5, if a data block label of the client service 3 that is sent by the add/drop node 1 to the transmission node 2 is the label b, the transmission node 2 may replace the label b with a label c in the process of performing the exchange operation, and optionally, the transmission node 2 may recalculate a CRC of the data block. For a specific implementation of the process, refer to FIG. 8. The label b is a label recognizable by the add/drop node 1 and the transmission node 2, and the label c is a label recognizable by the transmission node 2 and the add/drop node 3.

In an example of this application, after receiving the slice of the client service, the transmission node may perform integrity check according to the CRC included in the slice; and if the check succeeds, performs rate supervision, policy scheduling, and rate adaptation. Optionally, if the check fails, the slice is discarded.

It may be understood that, if a schematic structural diagram of the transmission node is shown in FIG. 4, the exchange operation may be performed by a service switching unit 42, the cache operation may be performed by a queue cache module 431, the rate supervision operation may be performed by a rate supervision module 432, the policy scheduling operation may be performed by a policy scheduling module 433, and the rate adaptation operation may be performed by a rate adaptation module 434. For related explanations and specific implementations of the rate supervision operation, the policy scheduling operation, and the rate adaptation operation, refer to the following description.

Figure 10:
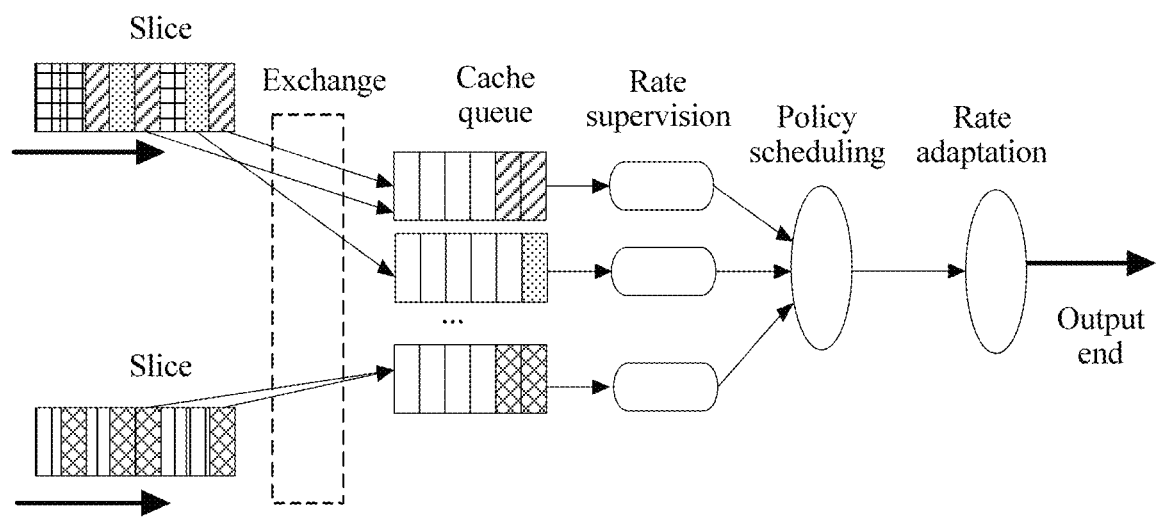
FIG. 10 is a schematic diagram of a processing process of a transmission node according to an embodiment of this application.

FIG. 10 shows a schematic diagram of an implementation process of S103. In FIG. 10, an example in which a plurality of client services that are input into two input ends of a transmission node are transmitted to one output end is used for description. Each small rectangular grid represents one slice, each small shadow grid represents one client service, and each small blank grid in a cache queue represents that no slice has been stored in the cache queue. The queue caching and the rate supervision are performed separately on each client service. After the policy scheduling and the rate adaptation are uniformly performed on the plurality of client services, the plurality of client services are output from the output end.

S104. The second add/drop node receives the slice, sent by the transmission node, of the client service and obtains the data block in each slice; restores the data blocks of a same client service to the form of the data packet or the form of the continuous data stream in a sequence of receiving times; and sends the client service to a corresponding receive end client device. The receive end client device receives the client service sent by the second add/drop node.

Based on the system architecture shown in FIG. 5, S104 may include: The add/drop node 2 receives the slice of the client service 1 sent by the transmission node 1, restores the slice of the client service 1 to the form of the data packet or the form of the continuous data stream, and sends the data packet or the continuous data stream to a client device 4. The client device 4 receives the client service 1 sent by the add/drop node 2. The add/drop node 2 receives the slice of the client service 2 sent by the transmission node 1, restores the slice of the client service 2 to the form of the data packet or the form of the continuous data stream, and sends the data packet or the continuous data stream to a client device 5. The add/drop node 3 receives the slice of the client service 3 sent by the transmission node 2, restores the slice of the client service 3 to the form of the data packet or the form of the continuous data stream, and sends the data packet or the continuous data stream to the client device 5. The client device 5 receives the client services 2 and 3 sent by the add/drop node 3.

In an example of this application, after receiving the slice of the client service, the second add/drop node may perform integrity check according to the CRC included in the slice; and if the check succeeds, deletes the label in the slice, and obtains the data block in the slice.

A schematic diagram of the specific implementation process of S104 may be an inverse process of FIG. 9.

The following describes the operations such as the rate supervision, the policy scheduling, and the rate adaptation in S103.

1. Rate Supervision

Rate supervision is a technology for controlling an output rate of a client service provided in this application, and helps reduce an occurrence probability of congestion and even avoid occurrence of congestion. Specifically, a plurality of counters are set in a transmission node, each client service may be corresponding to one counter, and each counter is used to control an output rate of the client service. Then, a plurality of data blocks are sent in a plurality of sending periods. In each sending period, when a count value of the counter reaches a preset threshold, at least one data block of the plurality of data blocks is sent. The counter may be implemented by software or hardware, and this is not limited in this application. The transmission node may perform the rate supervision separately on each client service.

Figure 11:
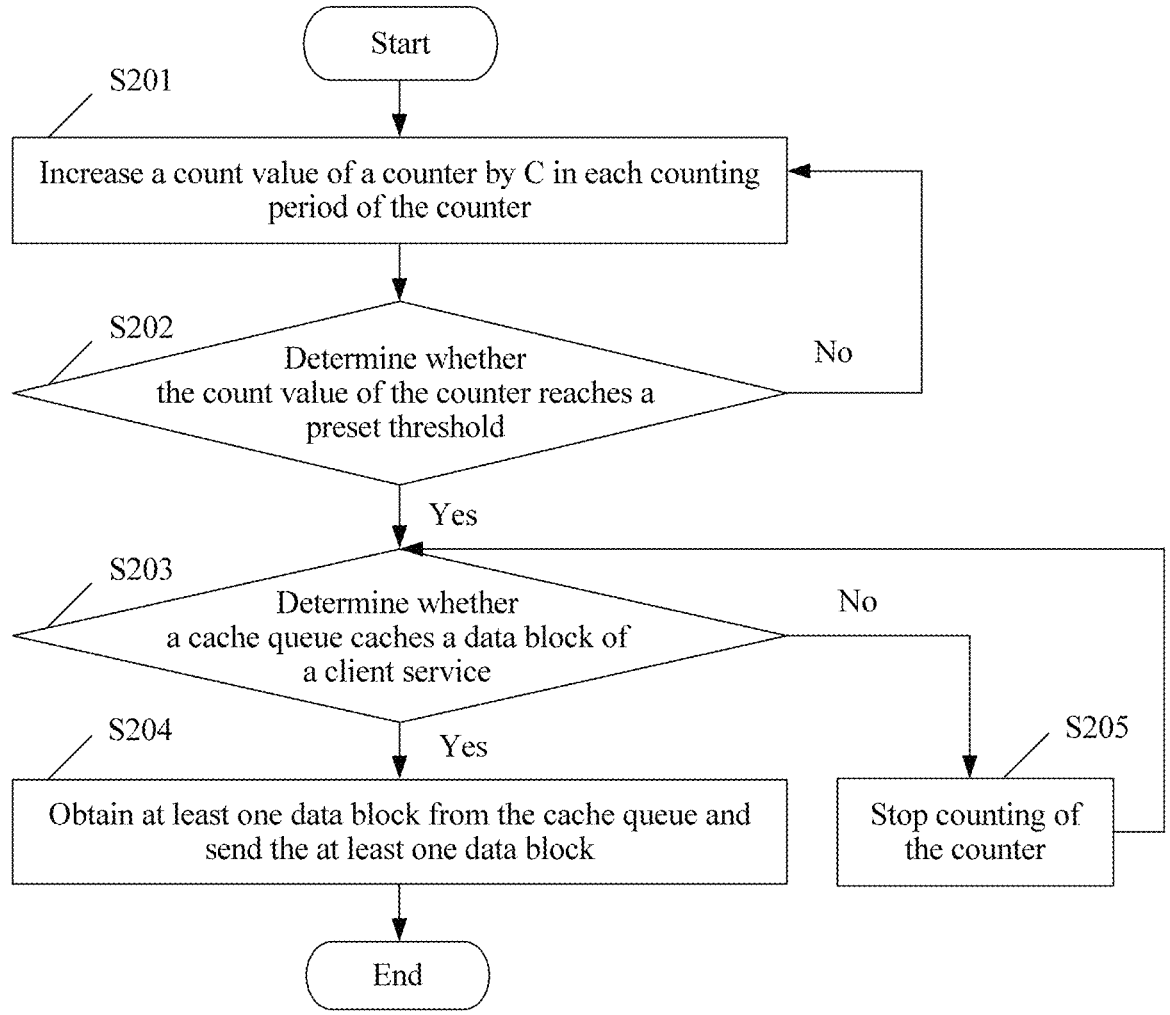
FIG. 11 is a schematic flowchart of a rate supervision method according to an embodiment of this application.

In an example of this application, the rate supervision is performed on an output rate of a client service. As shown in FIG. 11, in each sending period, the transmission node (which may be specifically a rate supervision module 432 in the transmission node) may perform the following steps S201 to S205.

S201. Increase a count value of a counter by C in each counting period of the counter, where C is less than or equal to a preset threshold.

S202. Determine whether the count value of the counter reaches the preset threshold.

If the count value of the counter reaches the preset threshold, S203 is performed; or if the count value of the counter does not reach the preset threshold, S201 is performed.

S203. Determine whether a cache queue of a client service caches a data block of the client service corresponding to the counter.

If the cache queue of the client service caches the data block of the client service corresponding to the counter, S204 is performed. If the cache queue of the client service does not cache the data block of the client service corresponding to the counter, S205 is performed.

S204. Obtain at least one data block from the cache queue and send the at least one data block.

After S204 is performed, this sending period ends.

S205. Stop counting of the counter.

After S205 is performed, S203 is performed.

It may be understood that in a process of performing the rate supervision, the transmission node may continuously or discontinuously receive a client service sent by the first add/drop node, or regularly receive a client service sent by another transmission node. Therefore, if the cache queue does not cache the client service, after S205 is performed for a while, S203 is performed; and in this case, the cache queue may have cached the client service, so that S204 may be performed. In addition, in specific implementation, duration of the time may also be set. In this way, when the counter stops counting for that duration, if S203 is performed, the cache queue still does not cache the client service, it may be considered that transmission of the client service ends. A specific value of the duration is not limited in this application.

The foregoing S201 to S205 describe a rate supervision process in one sending period. For a plurality of sending periods, optionally, the counter starts counting from an initial value in each sending period. Initial values for different sending periods may be the same or may be different. In an embodiment of this application, in an (i+1)th sending period, an initial value of the counter is a value that is obtained by subtracting the preset threshold from a count value of the counter at an end of an $i^{th}$ sending period, and i is an integer greater than or equal to 1. In another embodiment of this application, in each sending period, the initial value of the counter is a fixed value less than the preset threshold, for example, may be 0.

The sending period refers to a time interval between two consecutive time points of sending a data block, where one or more data blocks may be sent each time. The sending period may not be a preset value, and is related to the count value of the counter. Further, when the count value reaches the preset threshold, the sending period is related to whether the client service is cached. In any two sending periods, if the cache queue caches the client service when the count value reaches the preset threshold, the two sending periods are equal. Alternatively, the cache queue does not cache the client service when the count value reaches the preset threshold, but time periods for the counter to stop counting are equal, the two sending periods are equal. If the cache queue does not cache the client service when the count value reaches the preset threshold, and time periods for the counter to stop counting are not equal, the two sending periods are not equal.

It may be understood that, if the cache queue caches the client service when the count value reaches the preset threshold, the sending period is equal to a preset quantity of counting periods; if the cache queue does not cache the client service when the count value reaches the preset threshold, the sending period is equal to the preset quantity of counting periods and duration for stopping counting. Based on this, the rate supervision process provided in this application may be understood as follows: When the count value of the counter reaches the preset threshold, there is one opportunity for sending the client service, that is, the transmission node has one opportunity for sending the data block of the client service. At least one data block may be sent in each sending opportunity. Based on this, an output rate of the data block is controlled, that is, the output rate of the client service is controlled.

Quantities of data blocks sent in all sending periods may be the same or may be different. To ensure that the output rate is constant within a particular range, a concept of "a data block transmission period" is introduced in this application. The data block transmission period may include one or more sending periods, and quantities of data blocks sent in all data block transmission periods are the same.

For example, each data block transmission period includes two sending periods, one data block is sent in one of the two sending periods, and two data blocks are sent in the other sending period. In this case, quantities of data blocks sent in a plurality of sending periods may be 1, 2, 1, 2, 1, 2, . . . , or 1, 2, 2, 1, 1, 2, 1, 2, 2, 1, . . . . It can be learnt from the example that, controlling the quantity of data blocks sent in each sending period can make the quantities of data blocks sent in all data block transmission periods the same, so as to ensure that the output rate of the data block is constant per data block transmission period. It may be understood that an actual output rate of the data block is less than the constant output rate. Therefore, the constant output rate can be maintained provided that the duration of each sending period and the quantity of data blocks sent in each sending period are controlled. This helps reduce an occurrence probability of congestion on an output line interface.

For another example, each data block transmission period includes one sending period, and two data blocks are sent in the sending period. In this case, quantities of data blocks sent in a plurality of sending periods may be 2, 2, 2, . . . . It may be understood that, in this example, the data block transmission period is equal to the sending period. Therefore, the constant output rate can be maintained provided that the duration of each sending period and the quantity of data blocks sent in each sending period are controlled. This helps reduce an occurrence probability of congestion on an output line interface.

The counting period refers to a time period required for updating the count value of the counter each time. In actual implementation, the counting period may be implemented by using a pulse signal. For example, if a pulse period is equal to the counting period, the count value of the counter is increased by C in each pulse period. Optionally, the counting period may be equal to a data block transmission time of a line interface. For example, if output line interface bandwidth is 100 Gbps and a length of a slice in which the data block is located is 128 bytes, the data block transmission time of the line interface is 128 bytes/100 Gbps=10.24 ns (nanosecond). Certainly, the counting period may alternatively be greater than the data block transmission time of the line interface.

A physical meaning of the count value of the counter is not limited in this application. The following enumerates several implementations.

Manner 1: C is a quantity of counting times. In this case, the count value of the counter is increased by 1 in each counting period. A value of the preset threshold may be obtained by means of value conversion in a manner 2 as follows. Details are not described herein again. Certainly, the value of the preset threshold may alternatively be obtained in another manner, and this is not limited in this application.

Manner 2: C is determined according to bandwidth of a client service. In this case, optionally, the preset threshold is determined according to the output line interface bandwidth.

Optionally, C is a ratio of the bandwidth of the client service to unit bandwidth, the preset threshold is a ratio of the output line interface bandwidth to an adjustment value of the unit bandwidth, and the adjustment value of the unit bandwidth is greater than or equal to the unit bandwidth. It should be noted that, for ease of implementation, the preset threshold may be set to an integer. In this case, if the ratio of the output line interface bandwidth to the adjustment value of the unit bandwidth is a non-integer, the preset threshold may be an integer obtained by rounding down the non-integer. Certainly, in specific implementation, the preset threshold may alternatively be set to a non-integer, and this is not limited in this application.

It may be understood that a larger adjustment value of the unit bandwidth indicates a smaller determined preset threshold. In this case, the count value of the counter reaches the preset threshold more easily. Therefore, a smaller sending period indicates more sending opportunities and a higher output rate. Acceleration is intended to eliminate a slight sudden change of the output rate of the client service, thereby avoiding occurrence of congestion.

In an example of this application, if C is the ratio of the bandwidth of the client service to the unit bandwidth, the preset threshold may be less than or equal to output line bandwidth (that is, a line physical rate) and is a value that is an integral multiple of the unit bandwidth multiplied by an accelerated factor. For example, if the unit bandwidth is 2 Mbps and the bandwidth of the client service is 10 Mbps, C may be 10 Mbps/2 Mbps=5. If the output line interface bandwidth is 100 Gbps and the adjustment value of the unit bandwidth is 1001/1000 of the unit bandwidth, that is, the accelerated factor is 1001/1000, the preset threshold (marked as P) may be a value obtained by rounding down 100 Gbps/(2 Mbps×1001/1000), that is, 49950. In other words, in this application, through the rate supervision, a real-time output rate of the data block may be approximately equal to and less than the bandwidth of the client service. Based on this, a control layer may control a sum of the output line bandwidth of transmission nodes to be less than or equal to a sum of the bandwidth of client services transmitted on the output line interface bandwidth. Therefore, if each of the client services is controlled according to the foregoing method, this helps reduce an occurrence probability of congestion on the output line bandwidth.

In an example of this application, the count value of the counter is increased by C in each counting period of any sending period. When the count value of the counter reaches P, there is one opportunity for sending the client service. When the cache queue corresponding to the client service caches the client service, at least one data block of the client service is sent. At this point, this sending period ends. When the cache queue corresponding to the client service does not cache the client service, the counter stops counting; and when the cache queue caches the client service, this sending period ends. At an end of this sending period, the count value of the counter is set to the initial value. At this point, a next sending period starts.

Figure 12:
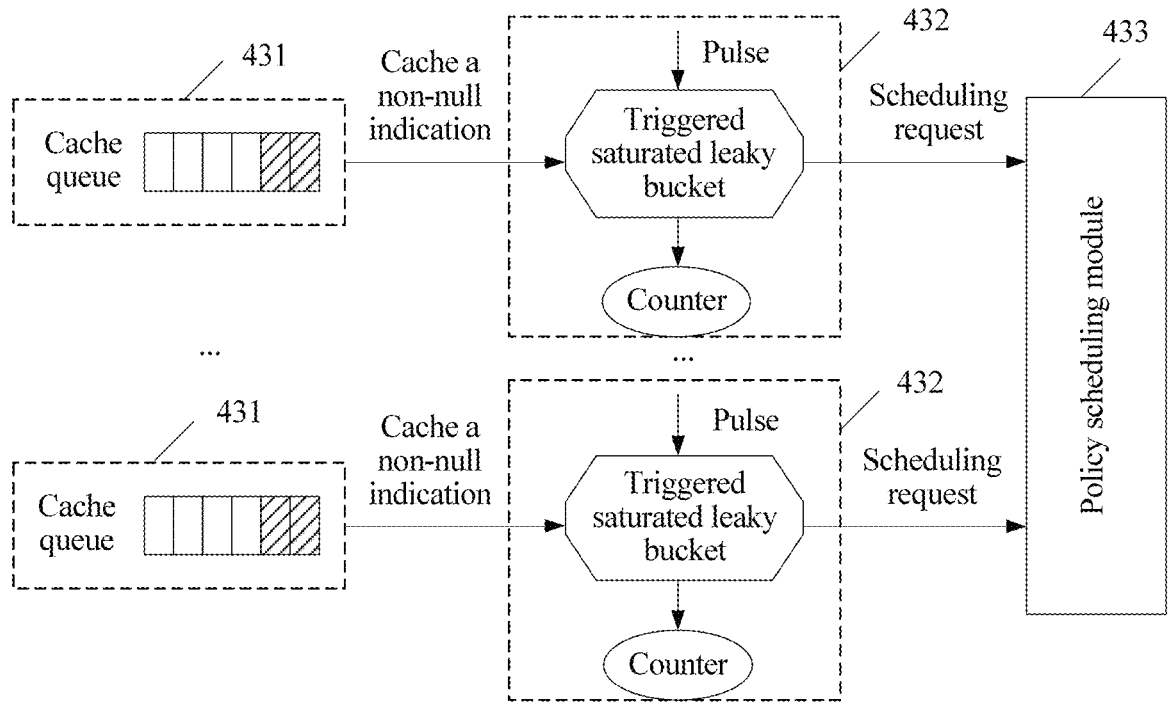
FIG. 12 is a schematic diagram of a process of a rate supervision method according to an embodiment of this application.

The process may be implemented by using a process shown in FIG. 12. In FIG. 12, a triggered saturated leaky bucket disposed in the rate supervision module 432 may be equivalent to a control module. The control module may control the count value of the counter to be increased by C in each pulse period. When the count value of the counter reaches P, if a non-null indication sent by a queue cache module 431 is detected, at least one data block in the cache queue is controlled to be output to a policy scheduling module 433. Optionally, the triggered saturated leaky bucket may send a scheduling request to the policy scheduling module 433, so as to request resource scheduling.

2. Policy Scheduling

Figure 13:
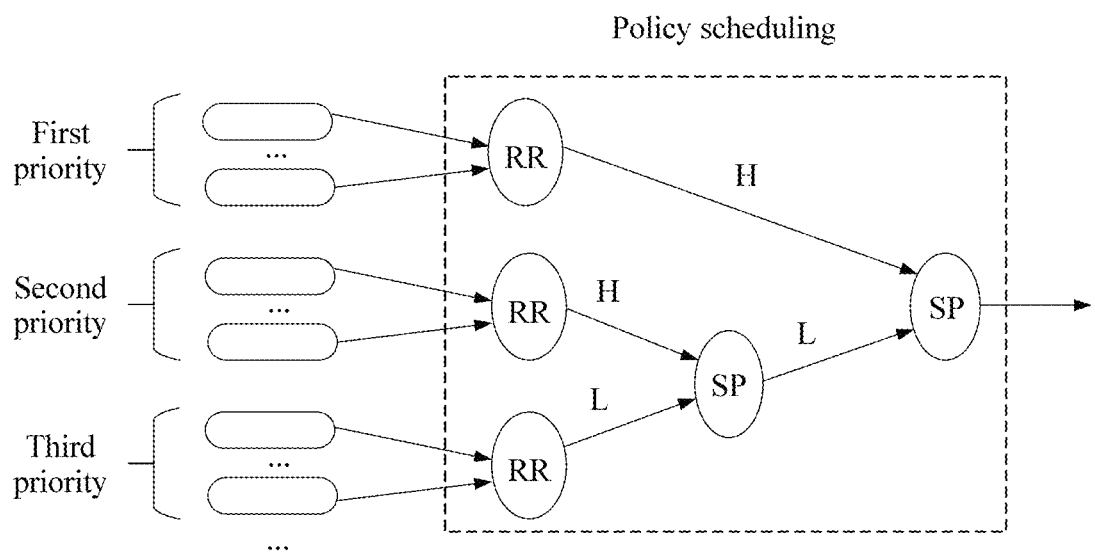
FIG. 13 is a schematic diagram of a process of a policy scheduling method according to an embodiment of this application.

A transmission node performs rate supervision separately on each client service and different client services that are input into the transmission node may be exchanged to a same output end. Therefore, there may be a case in which data blocks of different client services are simultaneously output from a rate supervision module 432 and are input into the same output end. This may cause congestion, and consequently some data blocks are lost. Based on this, this application provides an additional policy scheduling operation after a rate supervision operation and before output. The policy scheduling is a scheduling technology in which priorities of different client services are determined according to delay requirements of different client services, and the different client services are output from the transmission node according to the priorities. Specifically, the policy scheduling is a scheduling technology designed for different client services that are simultaneously output from the rate supervision module 432 and input into the same output end. Optionally, the policy scheduling may include the following content:

For any plurality of slices of the client services, if the plurality of slices are input into the policy scheduling module 433 one after another, the plurality of slices are output in a sequence of input times. If the plurality of slices are simultaneously input into the policy scheduling module 433, the plurality of slices are output according to strict priorities (SP) of client services to which the slices belong. A slice of a client service with a higher priority is output before a slice of a client service with a lower priority. If priorities of the client services to which the any plurality of slices belong are the same, these slices are output in a round robin (RR) manner. A schematic diagram of this process is shown in FIG. 13. FIG. 13 shows a first priority, a second priority, and a third priority. The first priority is higher than the second priority, and the second priority is higher than the third priority. In FIG. 13, "H" indicates a higher-priority client service of two client services complying with the SP, and "L" indicates a lower-priority client service of the two client services complying with the SP.

In specific implementation, at any step before the transmission node performs the policy scheduling, the method may further include: determining, by the transmission node, the priority of the client service according to an expected transmission delay of the client service. The expected transmission delay is an expected value that is set according to an actual requirement, and may be a preset value. Expected transmission delays of different client services may be the same or may be different. An expected transmission delay of a same client service in different scenarios may be the same or may be different. Optionally, each priority level may be corresponding to one expected transmission delay range. For example, a priority of a client service whose expected transmission delay is less than or equal to 5 μs (microsecond) is the first priority, a priority of a client service whose expected transmission delay is less than or equal to 20 μs (microsecond) is the second priority, and a priority of a client service whose expected transmission delay is less than or equal to 50 μs (microsecond) is the third priority. The first priority is higher than the second priority, and the second priority is higher than the third priority. For example, if an expected transmission delay of a client service is 5 μs, only the first priority can always meet the expected transmission delay. Another priority such as the second priority may sometimes meet the expected transmission delay, but cannot always meet the expected transmission delay. Therefore, the priority of the client service is the first priority. Another example is not enumerated.

Based on a rate supervision method provided in this application, in an example of this application, a control layer may allocate a corresponding transmission resource according to a delay requirement of the client service and a support capability of the system, so as to meet delay requirements of different client services. For example, it is assumed that output line interface bandwidth is 100 Gbps, a time for the transmission node to schedule one data block is 10.24 ns, and a time for the data block to be exchanged from an input end of the transmission node to a corresponding cache queue by using a service switching module is less than 3 μs. In this case, if the expected transmission delay is less than 5 μs, the priority of the client service is the first priority. Because the client service after strict rate supervision is performed may not be congested, introduction of the transmission delay is related only to a quantity of client service pipes of first-priority client services (that is, a quantity of first-priority client services). The system can support a maximum of (5 μs−3 μs)/10.24 ns=195 client services whose transmission delay is less than 5 μs. That is, when the quantity of all allocated first-priority client service pipes does not exceed 195, it can be ensured that the transmission delay is within 5 μs. For second-priority client services, if the expected transmission delay is less than 20 μs, the system can support, according to the same method, (20 μs−3 μs)/10.24 ns=1660 client service pipes whose transmission delay is less than 20 μs. Considering that there may be 195 first-priority queues, the system can support 1660−195=1465 client services whose transmission delay is less than 20 μs, and so on, so as to obtain a quantity of third-priority client services that can be supported by the system and a quantity of fourth-priority client services that can be supported by the system. In this way, the corresponding transmission resource can be allocated according to the transmission delay requirement of the client service and the support capability of the system, so as to meet delay requirements of different client services.

3. Rate Adaptation

Due to impact of a factor such as acceleration, output line interface bandwidth is greater than a sum of bandwidth of all client services transmitted by the output line interface. Therefore, rate adaptation is needed. Specifically, if a sum of real-time output rates of all client services at a particular moment is less than the output line interface bandwidth, an invalid data block is filled at this moment and output together with all the client services. The invalid data block filled in the rate adaptation process may be in a format same as a data block and is identified by using a special label, or a data block of another length or in another format may be used. This is not limited in this application.

The foregoing describes the solutions provided in the embodiments of this application mainly from a perspective of interaction between network elements. It may be understood that, to implement the foregoing functions, each network element such as the add/drop node, the transmission node, or the client device, includes a corresponding hardware structure and/or software module for performing each function. Persons skilled in the art should be easily aware that, units and algorithm steps in the examples described with reference to the embodiments provided in this specification may be implemented in a form of hardware or a combination of hardware and computer software in this application. Whether a function is performed by hardware or is performed in a manner in which computer software drives hardware depends on particular applications and design constraint conditions of the technical solutions. Persons skilled in the art may use different methods to implement the described functions for each particular application, but it should not be considered that the implementation goes beyond the scope of this application.

In the embodiments of this application, function module division may be performed on the add/drop node, the transmission node, or the client device according to the foregoing method examples. For example, each function module may be obtained by means of division according to a corresponding function, or at least two functions may be integrated into one processing module. The foregoing integrated module may be implemented in a form of hardware, or may be implemented in a form of a software function module. It should be noted that the module division in the embodiments of this application is an example, and is merely logical function division and may be other division in actual implementation.

Figure 14:
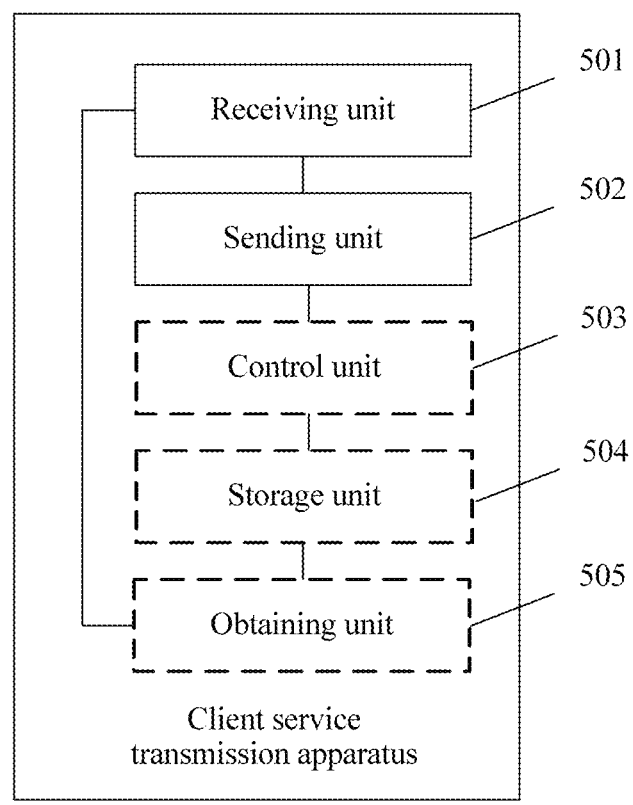
FIG. 14 is a schematic structural diagram of another client service transmission apparatus according to an embodiment of this application.

For example, when each function module is obtained by means of division according to the corresponding function, FIG. 14 shows a possible schematic structural diagram of a client service transmission apparatus (which may be specifically a transmission node or an add/drop node) provided in the foregoing embodiments. The client service transmission apparatus may include a receiving unit 501 and a sending unit 502.

The receiving unit 501 may be configured to receive a client service, where the client service includes a plurality of data blocks, the client service is corresponding to a counter, and the counter is used to control an output rate of the client service.

The sending unit 502 may be configured to send the plurality of data blocks in a plurality of sending periods, where when a count value of the counter reaches a preset threshold in each sending period, at least one data block of the plurality of data blocks is sent.

Optionally, the client service transmission apparatus may further include a control unit 503, configured to: before the count value of the counter reaches the preset threshold in each sending period, increase the count value of the counter by C in each counting period of the counter, where C is less than or equal to the preset threshold.

Optionally, C is determined according to bandwidth of the client service, and the preset threshold is determined according to output line interface bandwidth. Optionally, C is a ratio of the bandwidth of the client service to unit bandwidth, the preset threshold is a ratio of the output line interface bandwidth to an adjustment value of the unit bandwidth, and the adjustment value of the unit bandwidth is greater than or equal to the unit bandwidth.

Optionally, the counter starts counting from an initial value in each sending period.

Optionally, in an $(i+1)^{th}$ sending period, an initial value of the counter is a value that is obtained by subtracting the preset threshold from a count value of the counter at an end of an $i^{th}$ sending period, and i is an integer greater than or equal to 1.

Optionally, the control unit 503 may be further configured to: when the count value of the counter reaches the preset threshold in each sending period, stop counting of the counter if the client service is not cached.

Optionally, the client service transmission apparatus may further include: a storage unit 504, configured to store the client service into a cache queue; and an obtaining unit 505, configured to: when the count value of the counter reaches the preset threshold, obtain at least one data block from the cache queue.

Optionally, each data block of the plurality of data blocks has a fixed length.

Optionally, the sending unit 502 may be specifically configured to: send the at least one data block of the plurality of data blocks according to a priority of the client service, where a lower expected transmission delay indicates a higher priority.

All related content of steps in the foregoing method embodiments may be cited in function descriptions of corresponding function modules. Details are not described herein.

In an embodiment of this application, the client service transmission apparatus is presented in a form of function modules obtained by means of division according to corresponding functions, or the client service transmission apparatus is presented in a form of function modules obtained by means of division in an integrated manner. The "unit" herein may be an ASIC, a circuit, a processor that execute one or more software or firmware programs, a memory, an integrated logic circuit, and/or another component that can provide the foregoing functions.

In a simple embodiment, persons skilled in the art may figure out that the foregoing client service transmission apparatus may be implemented in a form shown in FIG. 2. For example, the receiving unit 501 and the sending unit 502 in FIG. 14 may be implemented by using a communications interface 23 in FIG. 2. The storage unit 504 in FIG. 14 may be implemented by using a memory 22 in FIG. 2. The control unit 503 and the obtaining unit 505 in FIG. 14 may be implemented by using a processor 21 in FIG. 2 to invoke application program code stored in the memory 22. This embodiment of this application does not impose any limitation thereto.

It may be understood that, function module division is performed, from different perspectives, on a client service transmission apparatus shown in FIG. 4 or FIG. 5 and the client service transmission apparatus shown in FIG. 14. For example, the control unit 503, the storage unit 504, and the obtaining unit 505 in FIG. 14 may be implemented by using a destination line processing unit 43 in FIG. 4. Specifically, the control unit 503 may be implemented by using a rate supervision module 432 in FIG. 5, and the storage unit 504 and the obtaining unit 505 may be implemented by using a queue cache module 431 in FIG. 5.

All or some of the foregoing embodiments may be implemented by software, hardware, firmware, or any combination thereof. When a software program is used to implement the embodiments, the embodiments may be implemented entirely or partially in a form of a computer program product. The computer program product includes one or more computer instructions. When the computer program instructions are loaded and executed on the computer, the procedure or functions according to the embodiments of this application are entirely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired manner (for example, a coaxial cable, an optical fiber, or a digital subscriber line (DSL)) or in a wireless manner (for example, infrared, radio, or microwave). The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method, comprising:
   obtaining a plurality of optical transport network (OTN) data blocks, wherein the plurality of OTN data blocks are used to carry a plurality of client services, wherein all OTN data blocks of the plurality of OTN data blocks have a same fixed length, and each OTN data block of the plurality of OTN data blocks comprises a label, a payload area and a cyclic redundancy check (CRC) area;
   for each OTN data block of the plurality of OTN data blocks, performing, based on the respective label comprised in the respective OTN data block, label exchange on the respective OTN data block, to obtain an exchanged OTN data block;
   for each exchanged OTN data block, caching the respective exchanged OTN data block, wherein the caching of each respective exchanged OTN data block obtains a plurality of cache queues, and wherein OTN data blocks that belong to a same cache queue in the plurality of cache queues are used to carry a same client service;

separately performing rate supervision on each of the plurality of cache queues;
performing OTN data block-level policy scheduling on first OTN data blocks in the plurality of cache queues; and
sending the first OTN data blocks;
wherein separately performing rate supervision on each of the plurality of cache queues, and sending the first OTN data blocks, comprises:
setting a counter for a first queue in the plurality of cache queues, wherein the counter is used to control an output rate of a client service corresponding to the first queue; and
sending the first OTN data blocks in the first queue in a plurality of sending periods, wherein when a count value of the counter reaches a preset threshold in each sending period, at least one first OTN data block of the first OTN data blocks in the first queue is sent; and
wherein before the count value of the counter reaches the preset threshold in each sending period, the method further comprises:
increasing the count value of the counter by C in each counting period of the counter, wherein C is less than or equal to the preset threshold, wherein C is a ratio of a bandwidth of the client service corresponding to the first queue to a unit bandwidth, the preset threshold is a ratio of an output line interface bandwidth to an adjusted value of the unit bandwidth, and the adjusted value of the unit bandwidth is greater than or equal to the unit bandwidth.

2. The method according to claim 1, wherein, for each of the plurality of OTN data blocks, the respective label comprised in the respective OTN data block is a global label or a line interface local label.

3. The method according to claim 2, further comprising:
when the respective label is the line interface local label, performing label replacement on the respective OTN data block.

4. The method according to claim 1, wherein for each OTN data block of the plurality of OTN data blocks, performing, based on the respective label comprised in the respective OTN data block, label exchange on the respective OTN data block comprises:
for each OTN data block of the plurality of OTN data blocks:
determining, based on the respective label comprised in the respective OTN data block, a next routing node of the respective OTN data block; and
performing label exchange on the respective OTN data block based on the next routing node of the respective OTN data block.

5. The method according to claim 1, wherein the counter starts counting from an initial value in each sending period.

6. The method according to claim 5, wherein in an $(i+1)^{th}$ sending period, an initial value of the counter is a value that is obtained by subtracting the preset threshold from a count value of the counter at an end of an $i^{th}$ sending period, and i is an integer greater than or equal to 1.

7. The method according to claim 1, further comprising:
when the count value of the counter reaches the preset threshold in each sending period, stopping counting of the counter when no OTN data block is cached.

8. The method according to claim 1, wherein performing policy scheduling, and sending the first OTN data blocks, comprises:
sending the first OTN data blocks in the plurality of cache queues based on priorities of the client services corresponding to the plurality of cache queues, wherein a shorter expected transmission delay of a client service indicates a higher priority.

9. An apparatus, comprising:
a non-transitory memory, configured to store computer-executable program code; and
a processor, coupled to the non-transitory memory;
wherein the program code comprises an instruction, and when executed by the processor, the instruction causes the apparatus to:
obtain a plurality of OTN data blocks, wherein the plurality of OTN data blocks are used to carry a plurality of client services, wherein all OTN data blocks of the plurality of OTN data blocks have a same fixed length, and each OTN block of the plurality of OTN data blocks comprises a label, a payload area and a CRC area;
for each OTN data block of the plurality of OTN data blocks, perform, based on the respective label comprised in the respective OTN data block, label exchange on the respective OTN data block, to obtain an exchanged OTN data block;
for each exchanged OTN data block, cache the respective exchanged OTN data block, wherein the caching of each respective exchanged OTN data block obtains a plurality of cache queues, and wherein OTN data blocks that belong to a same cache queue in the plurality of cache queues are used to carry a same client service;
separately perform rate supervision on each of the plurality of cache queues;
perform OTN data block-level policy scheduling on first OTN data blocks in the plurality of cache queues; and
send the first OTN data blocks; p2 wherein separately performing rate supervision on each of the plurality of cache queues, and sending the first OTN data blocks, comprises:
setting a counter for a first queue in the plurality of cache queues, wherein the counter is used to control an output rate of a client service corresponding to the first queue; and
sending the first OTN data blocks in the first queue in a plurality of sending periods, wherein when a count value of the counter reaches a preset threshold in each sending period, at least one first OTN data block of the first OTN data blocks is sent;
wherein the instruction, when executed by the processor, further causes the apparatus to:
before the count value of the counter reaches the preset threshold in each sending period, increase the count value of the counter by C in each counting period of the counter, wherein C is less than or equal to the preset threshold, wherein C is a ratio of a bandwidth of the client service corresponding to the first queue to a unit bandwidth, the preset threshold is a ratio of an output line interface bandwidth to an adjusted value of the unit bandwidth, and the adjusted value of the unit bandwidth is greater than or equal to the unit bandwidth.

10. The apparatus according to claim 9, wherein, for each of the plurality of OTN data blocks, the respective label comprised in the respective OTN data block is a global label or a line interface local label.

11. The apparatus according to claim 9, wherein for each OTN data block of the plurality of OTN data blocks, performing label exchange on the respective data block comprises:
for each OTN data block of the plurality of OTN data blocks:
determining, based on the respective label comprised in the respective OTN data block, a next routing node of the respective OTN data block; and
performing label exchange on the respective OTN data block based on the next routing node of the respective OTN data block.

12. An optical transport network (OTN) system, comprising:
a first device;
a second device; and
a third device;
wherein the first device is configured to send a plurality of OTN data blocks to the second device;
wherein the second device is configured to:
obtain the plurality of OTN data blocks, wherein the plurality of OTN data blocks are used to carry a plurality of client services, wherein all OTN data blocks of the plurality of OTN data blocks have a same fixed length, and each OTN data block of the plurality of OTN data blocks comprises a label, a payload area and a CRC area;
for each of the plurality of OTN data blocks, perform, based on the respective label comprised in the respective OTN data block, label exchange on the respective OTN data block, to obtain an exchanged OTN data block;
for each exchanged OTN data block, cache the respective exchanged OTN data block, wherein the caching of each respective exchanged OTN data block obtains a plurality of cache queues, and wherein OTN data blocks that belong to a same cache queue in the plurality of cache queues are used to carry a same client service;
separately perform rate supervision on each of the plurality of cache queues;
perform OTN data block-level policy scheduling on first OTN data blocks in the plurality of cache queues; and
send the first OTN data blocks to the third device;
wherein separately performing rate supervision on each of the plurality of cache queues, and sending the first OTN data blocks, comprises:
setting a counter for a first queue in the plurality of cache queues, wherein the counter is used to control an output rate of a client service corresponding to the first queue; and
sending the first OTN data blocks in the first queue in a plurality of sending periods, wherein when a count value of the counter reaches a preset threshold in each sending period, at least one first OTN data block of the first OTN data blocks is sent;
wherein before the count value of the counter reaches the preset threshold in each sending period, the second device is further configured to:
increase the count value of the counter by C in each counting period of the counter, wherein C is less than or equal to the preset threshold, wherein C is a ratio of a bandwidth of the client service corresponding to the first queue to a unit bandwidth, the preset threshold is a ratio of an output line interface bandwidth to an adjusted value of the unit bandwidth, and the adjusted value of the unit bandwidth is greater than or equal to the unit bandwidth.

13. The OTN system according to claim 12, wherein, for each of the plurality of OTN data blocks, the respective label comprised in the respective OTN data block is a global label or a line interface local label.

14. The OTN system according to claim 13, when the respective label is the line interface local label, the second device is configured to:
perform label replacement on the respective OTN data block.

15. The OTN system according to claim 12, wherein for each OTN data block of the plurality of OTN data blocks, perform, based on the respective label comprised in the respective OTN data block, label exchange on the respective OTN data block comprises:
for each OTN data block of the plurality of OTN data blocks:
determine, based on the respective label comprised in the respective OTN data block, a next routing node of the respective OTN data block; and
perform label exchange on the respective OTN data block based on the next routing node of the respective OTN data block.

16. The OTN system according to claim 12, wherein the counter starts counting from an initial value in each sending period.

17. The OTN system according to claim 12, wherein in an $(i+1)^{th}$ sending period, an initial value of the counter is a value that is obtained by subtracting the preset threshold from a count value of the counter at an end of an $i^{th}$ sending period, and i is an integer greater than or equal to 1.

* * * * *

UNITED STATES PATENT AND TRADEMARK OFFICE
CERTIFICATE OF CORRECTION

| | |
|---|---|
| PATENT NO. | : 11,785,113 B2 |
| APPLICATION NO. | : 16/661559 |
| DATED | : October 10, 2023 |
| INVENTOR(S) | : Yujie Chen |

It is certified that error appears in the above-identified patent and that said Letters Patent is hereby corrected as shown below:

In the Claims

Column 22, Claim 9, Line 37; please delete "blocks; p2 wherein" and insert --blocks; wherein--

Signed and Sealed this
Second Day of January, 2024

Katherine Kelly Vidal
*Director of the United States Patent and Trademark Office*